(12) United States Patent
Kurashima

(10) Patent No.: US 9,141,209 B2
(45) Date of Patent: Sep. 22, 2015

(54) TOUCH PANEL, DISPLAY DEVICE, AND ELECTRONIC APPARATUS

(71) Applicant: Japan Display Inc., Tokyo (JP)

(72) Inventor: Takeshi Kurashima, Nagano (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/713,450

(22) Filed: Dec. 13, 2012

(65) Prior Publication Data
US 2013/0187872 A1  Jul. 25, 2013

(30) Foreign Application Priority Data

Jan. 24, 2012 (JP) ................................. 2012-012396

(51) Int. Cl.
*G06F 3/041* (2006.01)
*G06F 3/044* (2006.01)

(52) U.S. Cl.
CPC ............... *G06F 3/041* (2013.01); *G06F 3/044* (2013.01); *G06F 2203/04111* (2013.01)

(58) Field of Classification Search
CPC ............. G06F 2203/04111; G06F 2203/04112
See application file for complete search history.

(56) References Cited

U.S. PATENT DOCUMENTS 8,444,448 B2 * 5/2013 Ishida et al. .................... 445/24
2008/0309635 A1 * 12/2008 Matsuo ......................... 345/173
2011/0090159 A1 * 4/2011 Kurashima ................... 345/173
2011/0134055 A1 * 6/2011 Jung et al. .................... 345/173
2011/0304564 A1 * 12/2011 Kim et al. ..................... 345/173

FOREIGN PATENT DOCUMENTS

| JP | 2010-160670 A | 7/2010 |
| JP | 2010-277461   | 12/2010 |
| JP | 2011-118494 A | 6/2011 |

OTHER PUBLICATIONS

Japanese Office Action mailed Mar. 10, 2015 for corresponding Japanese Application No. 2012-012396.

* cited by examiner

*Primary Examiner* — Kathy Wang-Hurst
*Assistant Examiner* — Peijie Shen
(74) *Attorney, Agent, or Firm* — Fishman Stewart Yamaguchi PLLC

(57) ABSTRACT

A touch panel includes: first electrodes extending in a first direction; second electrodes extending in a direction intersecting the first direction; and an insulating layer insulating and separating the first electrodes from the second electrodes. The second electrodes are strip-shaped electrodes which include first island-shaped electrodes formed in the same layer as the first electrodes and relay electrodes electrically connecting two adjacent first island-shaped electrodes to each other and crossing over the first electrodes. The insulating layer has contact holes at positions corresponding to both ends of each of the relay electrodes in a longitudinal direction. A distance between two contact holes provided so as to correspond to both the ends of each of the relay electrodes in the longitudinal direction is the same as or shorter than a distance between two first island-shaped electrodes coming into contact with both the ends of each of the relay electrodes.

7 Claims, 8 Drawing Sheets

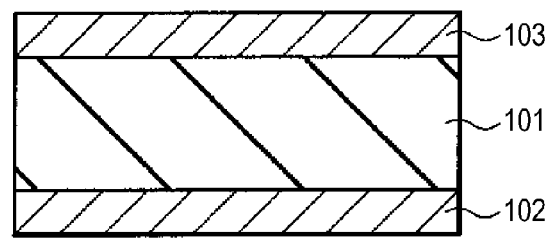
FIG.1A
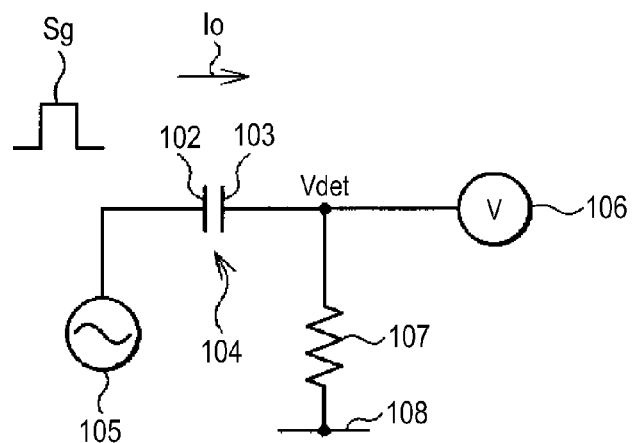
FIG.1B
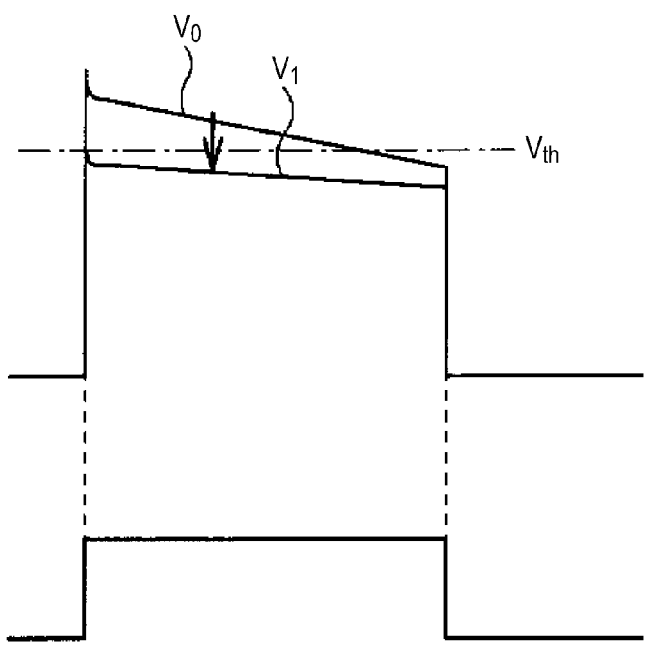
FIG.2A
FIG.2B

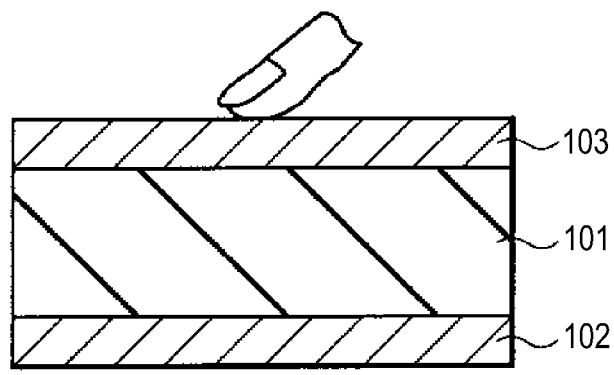
FIG.3A
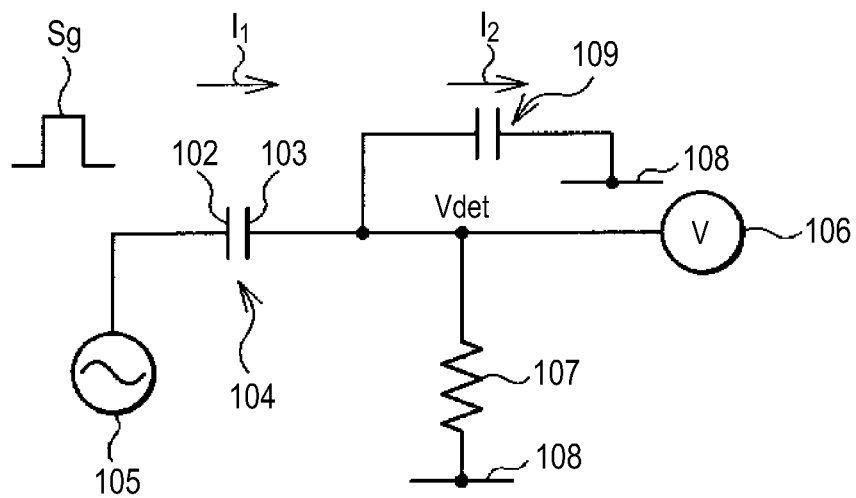
FIG.3B
FIG.4
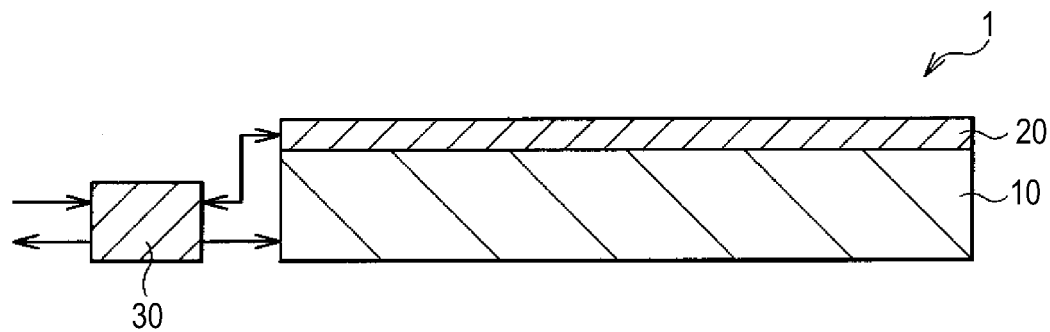

TOUCH PANEL, DISPLAY DEVICE, AND ELECTRONIC APPARATUS

FIELD

The present technology relates to a touch panel which enables a position at which an object (hereinafter, referred to as the "finger or the like") such as the finger, the hand, the arm, or a pen is touched on a detection surface of the touch panel to be detected. In addition, the present technology relates to a display device and an electronic apparatus having the touch panel.

BACKGROUND

In the related art, there have been techniques in which information is input by the touch of the finger or the like. Among them, as a technique which has particularly attracted attention, there is a display device which can input information in the same manner as in a case of pressing a normal button with the finger or the like, by touching various buttons displayed on a display with the finger or the like. This technique enables the display and the buttons to be used in common, and thus brings great merits of space saving or reduction in the number of components.

There are various types of touch panels which detect the touch of the finger or the like, and a capacitance type is generally widespread in a device in which multi-point detection is necessary such as a smart phone (for example, refer to JP-A-2010-277461). The capacitance type touch panel includes, for example, a matrix-shaped electrode pattern in the detection surface, and detects a capacitance variation of a position touched by the finger or the like.

SUMMARY

Here, the electrode pattern includes, for example, as shown in FIG. 12, a plurality of first electrodes E1 extending in a predetermined direction and a plurality of second electrodes E2 extending in a direction perpendicular to the first electrodes E1. The second electrodes E2 include, for example, a plurality of island-shaped electrodes E3 disposed in the same layer as the first electrodes E1, and relay electrodes E4 electrically connecting the island-shaped electrodes E3 to each other and crossing over the first electrodes E1. Here, the relay electrodes E4 are formed in a further upper layer than the first electrodes E1. For this reason, in the detection surface, there is a problem in that silhouettes of the relay electrodes E4 are viewed.

It is therefore desirable to provide a touch panel in which an electrode pattern is difficult to view, and a display and an electronic apparatus having the touch panel.

An embodiment of the present technology is directed to a touch panel including a plurality of first electrodes extending in a first direction; a plurality of second electrodes extending in a direction intersecting the first direction; and an insulating layer insulating and separating the first electrodes from the second electrodes. The second electrodes are strip-shaped electrodes which include a plurality of first island-shaped electrodes formed in the same layer as the first electrodes and relay electrodes electrically connecting two adjacent first island-shaped electrodes to each other and crossing over the first electrodes. The insulating layer has contact holes at positions corresponding to both ends of each of the relay electrodes in a longitudinal direction. A distance between two contact holes provided so as to correspond to both ends of each of the relay electrodes in the longitudinal direction is the same as or shorter than a distance between two first island-shaped electrodes coming into contact with both ends of each of the relay electrodes.

Another embodiment of the present technology is directed to a display device including an image generation unit that generates an image; a touch panel that is disposed on a surface of the image generation unit; and a control unit that controls the image generation unit and the touch panel.

The touch panel included in the display device according to the embodiment of the present technology has the same configuration as the above-described touch panel. An electronic apparatus according to still another embodiment of the present technology includes the above-described display device.

In the touch panel, the display device, and the electronic apparatus according to the embodiments of the present technology, two contact holes are provided so as to correspond to both ends of the relay electrode corresponding to a portion crossing over the first electrode in the second electrode. In addition, the distance between the two contact holes is the same as or shorter than the distance between two first island-shaped electrodes coming into contact with both ends of the relay electrode. Thereby, the length of the relay electrode in the longitudinal direction can be made shorter than in a case where the distance between the two contact holes is longer than the two first island-shaped electrodes, and, as a result, it is possible to reduce the area of the relay electrode.

According to the touch panel, the display device, and the electronic apparatus of the embodiments of the present technology, it is possible to reduce the area of the relay electrode, and thus a silhouette of an electrode pattern can be made difficult to view.

BRIEF DESCRIPTION OF THE DRAWINGS

FIGS. 1A and 1B are diagrams illustrating an operation principle of a touch detection type used in a display device according to an embodiment of the present technology, and are diagrams illustrating a non-touch state.

FIGS. 2A and 2B are diagrams illustrating an operation principle of a touch detection type used in the display device according to the embodiment of the present technology, and diagrams illustrating waveform examples of the driving signal and the detection signal of a touch sensor.

FIGS. 3A and 3B are diagrams illustrating an operation principle of a touch detection type used in the display device according to the embodiment of the present technology, and are diagrams illustrating a state where the finger is touched.

FIG. 4 is a diagram illustrating an example of the cross-sectional configuration of the display device according to the embodiment of the present technology.

DETAILED DESCRIPTION

Figure 5:
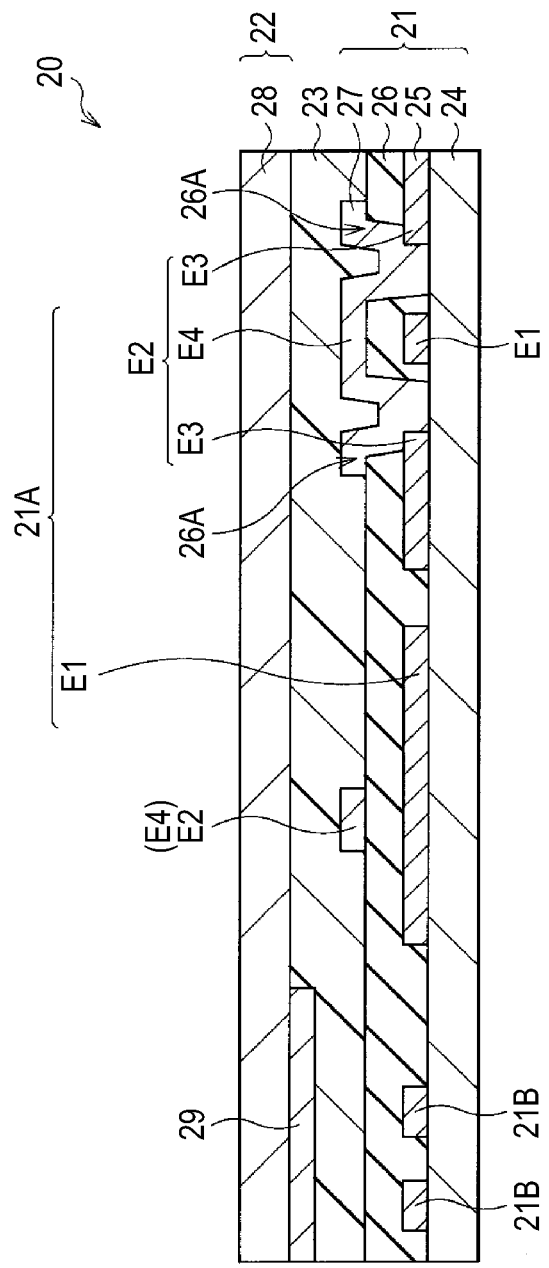
FIG. 5 is a diagram illustrating an example of the cross-sectional configuration of the touch pane of FIG. 4.

Hereinafter, embodiments of the present technology will be described in detail with reference to the accompanying drawings. In addition, the description will be made in the following order.
1. Basic principle of touch detection type
2. Embodiment
3. Modified examples
4. Application example

1. BASIC PRINCIPLE OF TOUCH DETECTION TYPE

First, a basic principle of a touch detection type used in a display device according to the following embodiment will be described. The touch detection type is implemented by a capacitance type touch sensor. FIG. 1A schematically shows the touch sensor. FIG. 1B shows an equivalent circuit of the touch sensor of FIG. 1A and peripheral circuits connected to the touch sensor. The touch sensor includes a dielectric 101, and a pair of electrodes 102 and 103 disposed opposite to each other with the dielectric 101 interposed therebetween, and is indicated by a capacitive element 104 as shown in FIG. 1B in an equivalent circuit.

One end (the electrode 102) of the capacitive element 104 is connected to an AC signal source 105. The other end (the electrode 103) of the capacitive element 104 is connected to a voltage detection circuit 106, and is connected to a reference potential line 108 via a resistor 107. The AC signal source 105 outputs AC rectangular waves Sg with a predetermined frequency (for example, approximately several kHz to several tens of kHz). The voltage detection circuit 106 detects a peak value of an input signal, and determines touch and non-touch of the finger on the touch sensor on the basis of the detected voltage. The reference potential line 108 is electrically connected to a member (for example, a ground layer of a printed circuit board or a conductive casing) which gives a potential used as a reference of a circuit operation, for example, in a device which has the touch sensor mounted therein, and has the same potential (reference potential) as the member when being connected to the member. The reference potential is, for example, a ground potential.

In the touch sensor, when the AC rectangular wave Sg (FIG. 2B) is applied to the electrode 102 from the AC signal source 105, an output waveform (a detected signal Vdet) as shown in FIG. 2A appears in the electrode 103.

In a state (FIG. 1A) where an object such as the finger does not touch the touch sensor, as shown in FIG. 1B, a current I0 corresponding to a capacitance value of the capacitive element 104 flows according to the charge and discharge of the capacitive element 104. A potential waveform of the electrode 103 side of the capacitive element 104 at this time becomes, for example, a waveform V0 as shown in FIG. 2A, which is detected by the voltage detection circuit 106.

On the other hand, in a state (FIG. 3A) where an object such as the finger is touched on the touch sensor, as shown in FIG. 3B, a capacitive element 109 formed by the object such as the finger is added in series to the capacitive element 104. In this state, currents I1 and I2 flow according to the charge and discharge of the capacitive elements 104 and 109 respectively. At this time, a potential waveform at the electrode 103 becomes a waveform V1 as shown in FIG. 2A, which is detected by the voltage detection circuit 106. A potential of the electrode 103 is a voltage-divided potential defined by values of the currents I1 and I2 flowing through the capacitive elements 104 and 109. For this reason, the waveform V1 has a smaller value than the waveform V0 in a non-touch state. Thereafter, the detected voltage and a predetermined threshold value Vth are compared by the voltage detection circuit 106, and when the detected voltage is equal to or less than the threshold value Vth, a non-touch state is determined, whereas when the detected voltage is larger than the threshold value Vth, a touch state is determined. In the above-described way, touch detection is performed. In addition, in the display device according to the following embodiment, detection types different from the above-described type may be used.

2. EMBODIMENT

[Configuration]
FIG. 4 shows an example of the cross-sectional configuration of a display device 1 according to the embodiment of the present technology. The display device 1 is a display device with the touch sensor, and includes an image generation unit 10, a capacitance type touch panel 20, and a control unit 30. The touch panel 20 is formed separately from the image generation unit 10, and is disposed on a surface of the image generation unit 10. The control unit 30 controls the image generation unit 10 and the touch panel 20. Specifically, the control unit 30 drives the image generation unit 10 on the basis of an image signal input from an external device, further drives the touch panel 20, and outputs a signal according to a detected signal of the touch panel 20 to the external device.
(Image Generation Unit 10)

The image generation unit 10 generates an image on the basis of a signal input from the control unit 30. The image generation unit 10 includes, for example, a liquid crystal display panel which varies an arrangement of liquid crystal molecules so as to transmit and modulate incident light, thereby generating an image, and a light source which illuminates the liquid crystal display panel from a back side thereof. In addition, the image generation unit 10 may have a configuration different from the above-described configuration, and, may include, for example, an organic EL display panel which generates an image by enabling an organic EL element to emit light.
(Touch Panel 20)

Figure 6:
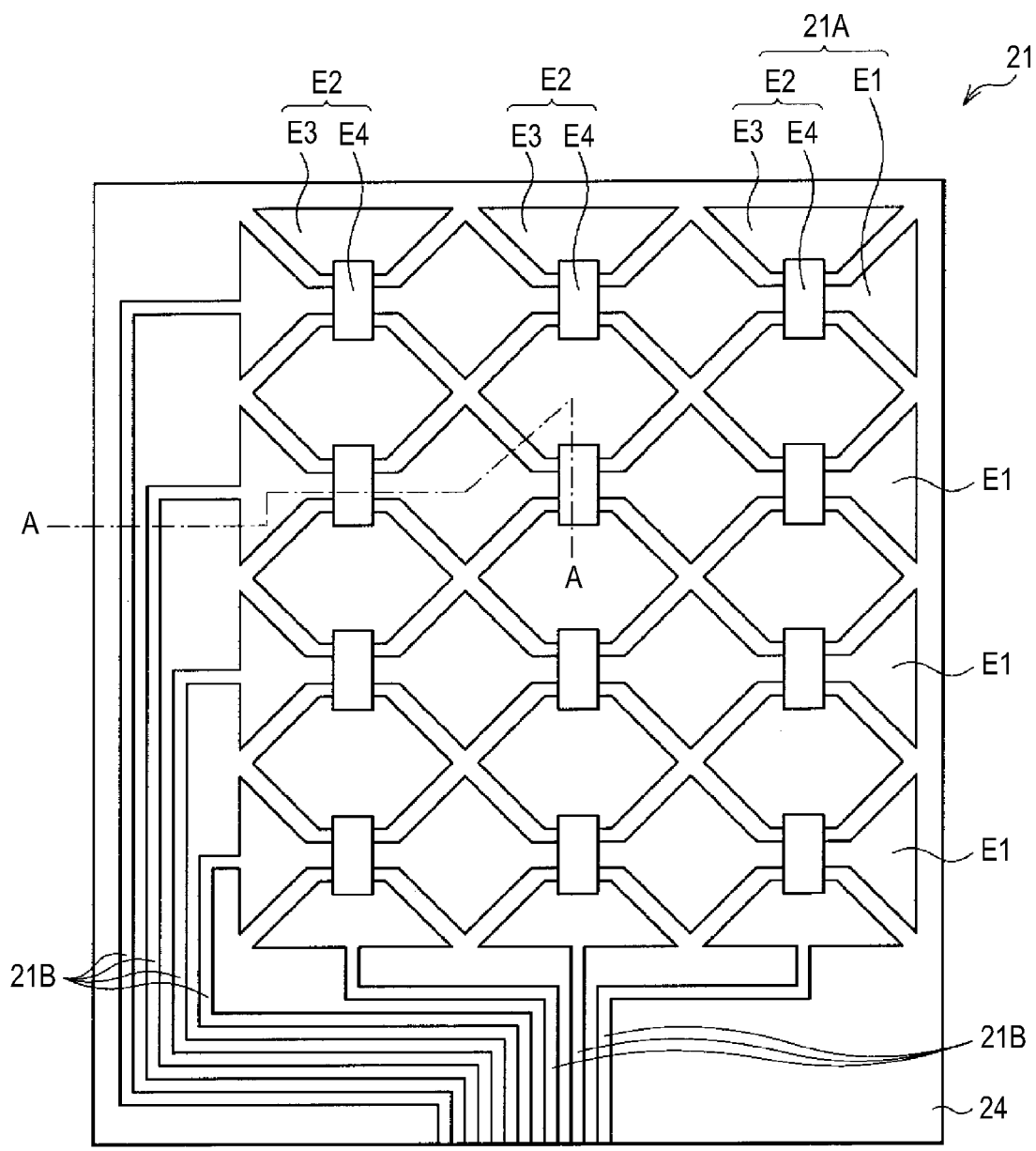
FIG. 6 is a diagram illustrating an example of the layout of the electrode pattern of the touch panel of FIG. 4.

FIG. 5 shows an example of the cross-sectional configuration of the touch panel 20. FIG. 6 shows an example of the layout of the electrode pattern of the touch panel 20. In addition, FIG. 5 shows a cross-sectional configuration of a portion corresponding to the line A-A of FIG. 6 in the touch panel 20.

The touch panel 20 inputs information when the finger or the like is touched on an image display surface (a detection surface of the touch panel 20) of the display device 1. The touch panel 20, for example, corresponds to a specific example of the above-described capacitance type touch sensor, and detects touch and non-touch of the finger or the like on the detection surface by using an XY matrix. The touch panel 20 is joined to, for example, the surface of the image generation unit 10 via an adhesive layer or a sticky layer.

The touch panel 20 is obtained by joining a wire substrate 21 and a cover substrate 22 via an adhesive layer 23. The wire substrate 21 and the cover substrate 22 are disposed so as to face each other with the adhesive layer 23 interposed therebetween. The wire substrate 21 is obtained by laminating, for example, a first conductive layer 25, an insulating layer 26, and a second conductive layer 27 in this order on an upper surface (a surface on the cover substrate 22 side) of a substrate 24. The cover substrate 22 is provided with, for example, a light blocking layer 29 on a lower surface (a surface on the wire substrate 21 side) of a substrate 28. The substrate 24 and the substrate 28 are disposed so as to face each other with the adhesive layer 23 interposed therebetween. The adhesive layer 23 is obtained by, for example, curing a UV cured resin.

The substrate 24 is a substrate on which the first conductive layer 25, the insulating layer 26, and the second conductive layer 27 are formed, and holds the first conductive layer 25, the insulating layer 26, and the second conductive layer 27. The substrate 24 includes an insulating and translucent member, and, includes, for example, a glass substrate or an insulating and translucent resin film. The substrate 28 is a substrate which forms the detection surface and covers the first conductive layer 25 and the second conductive layer 27. The substrate 28 also holds the light blocking layer 29. The substrate 28 includes an insulating and translucent member, and, includes, for example, a glass substrate or an insulating and translucent resin film.

The first conductive layer 25 and the second conductive layer 27 are used to detect touch and non-touch of the finger or the like on the detection surface, and are made of a translucent and conductive material such as, for example, ITO (Indium Tin Oxide). The insulating layer 26 is disposed between the first conductive layer 25 and the second conductive layer 27. The insulating layer 26 is used to insulate and separate first electrodes E1 described later and second electrodes E2 described later from each other, and is made of a translucent and insulating material such as, for example, an acryl resin. The insulating layer 26 has contact holes 26A at predetermined positions. In addition, detailed positions of the contact holes 26A will be described later in detail. The light blocking layer 29 is used to prevent a silhouette of a signal wire 21B described later from being viewed on the image display surface, and is made of a light blocking material.

The first conductive layer 25 and the second conductive layer 27 include a sensor electrode 21A which detects touch and non-touch on the detection surface and a plurality of signal wires 21B which connect the sensor electrode 21A and the control unit 30 to each other. The sensor electrode 21A is disposed at a position corresponding to a portion excluding an outer edge of the upper surface in the wire substrate 21. The signal wires 21B are disposed at a position corresponding to the outer edge in the upper surface of the wire substrate 21.

The sensor electrode 21A includes a plurality of first electrodes E1 extending in a predetermined direction (first direction) and a plurality of second electrodes E2 extending in a direction intersecting (for example, perpendicular to) the first electrodes E1. The first electrodes E1 are constituted by a portion of the first conductive layer 25. In other words, the first conductive layer 25 includes the first electrodes E1. The first electrodes E1 are formed so as to be contacted to the upper surface (the surface on the cover substrate 22 side) of the substrate 24, and are strip-shaped electrodes including a plurality of island-shaped electrodes and connection electrodes connecting two adjacent island-shaped electrodes to each other. Here, the width of the connection electrode is smaller than the width of the island-shaped electrode.

The second electrodes E2 are constituted by a portion of the first conductive layer 25 and the whole or a part of the second conductive layer 27. In other words, the first conductive layer 25 includes the overall first electrodes E1 and some of the second electrodes E2, and the second conductive layer 27 includes some of the second electrodes E2. The second electrodes E2 are strip-shaped electrodes which include a plurality of island-shaped electrodes E3 disposed in the same layer as the first electrodes E1 and relay electrodes E4 which electrically connect two adjacent island-shaped electrodes E3 to each other and cross the first electrodes E1 (specifically, the connection electrodes). In other words, the first conductive layer 25 includes the overall first electrodes E1 and the respective island-shaped electrodes E3, and the second conductive layer 27 includes the relay electrodes E4. Here, the width of the relay electrode E4 is smaller than the width of the island-shaped electrode E3. In addition, the island-shaped electrodes E3 and the island-shaped electrodes of the first electrodes E1 have a delta arrangement.

The relay electrodes E4 have a strip shape extending in the extending direction of the second electrodes E2. In a relay electrode E4, one end thereof is connected to the island-shaped electrode E3 and the other end thereof is connected to another island-shaped electrode E3, and a portion crossing over the first electrode E1 is disposed in a further upper layer than the first electrode E1. The "further upper layer than the first electrode E1" indicates a layer coming into contact with the upper surface of the insulating layer 26, and, specifically, indicates the second conductive layer 27. Therefore, the relay electrodes E4 are disposed so as to be closer to the substrate 28 than the island-shaped electrodes E3. The relay electrodes E4 are collectively formed in manufacturing procedures, and thus are formed of a single layer. On the other hand, the island-shaped electrodes E3 are formed along with the first electrodes E1 in the same manufacturing procedure, and thus the island-shaped electrodes E3 and the first electrodes E1 are made of the same material.

Figure 7:
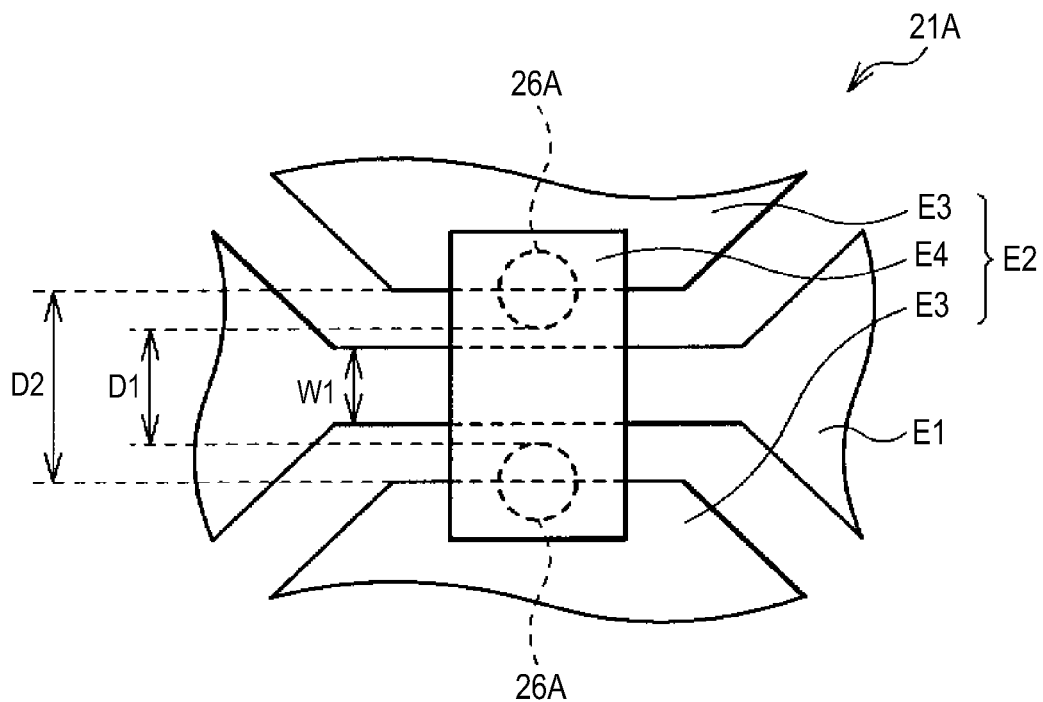
FIG. 7 is a diagram illustrating the enlarged electrode pattern of FIG. 6.

Portions of both ends of the relay electrode E4 in the longitudinal direction are disposed in the contact holes 26A of the insulating layer 26. In other words, the insulating layer 26 has the contact holes 26A at the positions corresponding to both ends of the relay electrode E4 in the longitudinal direction. Here, as shown in FIGS. 5 and 7, the contact holes 26A are disposed at positions where end portions of the island-shaped electrodes E3 are exposed inside the bottom surfaces of the contact holes 26A and the first electrodes E1 are not exposed inside the bottom surfaces of the contact holes 26A. Therefore, the relay electrode E4 comes into contact with the portions exposed inside the contact holes 26A of the island-shaped electrodes E3 and is insulated and separated from the first electrodes E1 by the insulating layer 26.

In addition, the end surfaces of both ends of the relay electrode E4 in the longitudinal direction are preferably formed outside the contact holes 26A and are preferably formed so as to come into contact with the upper surface of the insulating layer 26. In a case where the end surfaces are formed inside the contact holes 26A, there is a probability that the end surfaces may be formed on the island-shaped electrodes E3 (that is, on the bottom surfaces of the contact holes 26A) depending on manufacturing errors. At that time, if some of the island-shaped electrodes E3 are not covered by the relay electrode E4 but are exposed, there is a probability that the exposed portions may be etched in subsequent steps and thus the electrical connection between the island-shaped electrodes E3 and the relay electrode E4 may be cut. Therefore, in order to prevent this, the end surfaces of both ends of the relay electrode E4 in the longitudinal direction are preferably formed so as to come into contact with the upper surface of the insulating layer 26.

A distance D1 between the two contact holes 26A so as to correspond to both ends of the relay electrode E4 in the longitudinal direction is longer than a width W1 of the relay electrode of the first electrode E1, and is shorter than a distance D2 between two island-shaped electrodes E3 coming into contact with both ends of the relay electrode E4 in the longitudinal direction. Therefore, as shown in a comparative example of FIG. 8, the length of the relay electrode E4 in the longitudinal direction is shorter and the area of the relay electrode E4 is smaller than a case where the distance D1 is longer than the distance D2. However, since the area of the relay electrode E4 is smaller, it is difficult for a silhouette of the relay electrode E4 to be viewed on the image display surface. As in the present embodiment, since the distance D1 is shorter than the distance D2, a silhouette of the relay electrode E4 is barely viewed on the image display surface.

Figure 8:
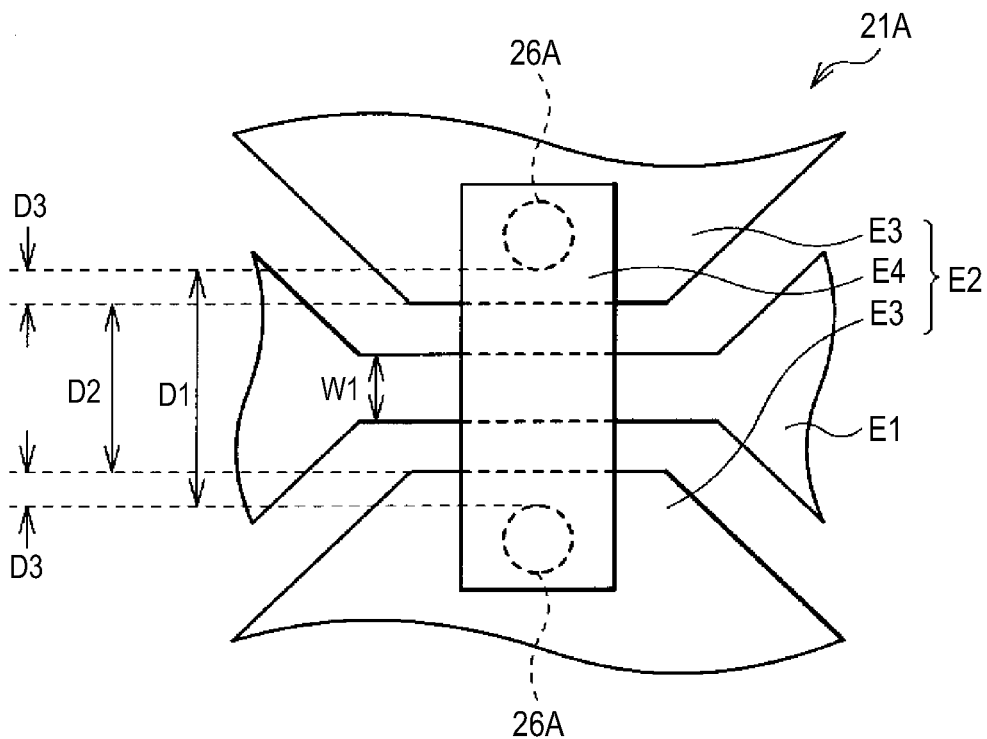
FIG. 8 is a diagram illustrating an example of the electrode pattern according to a comparative example.

On the other hand, in the comparative example of FIG. 8, in a case where the bottom surface of the contact hole 26A is certainly formed on the island-shaped electrode E3, it is necessary for a distance D3 between the contact hole 26A and the end surface of the island-shaped electrode E3 to be a length (for example, 15 μm) in consideration of manufacturing errors. Therefore, in the comparative example of FIG. 8, the length of the relay electrode E4 in the longitudinal direction is larger than the length of the relay electrode E4 according to the present embodiment by at least, for example, 30 μm, and thus there is a probability that a silhouette of the relay electrode E4 may be clearly viewed.

[Operation]

Next, a description will be made of an example of the operation of the display device 1 according to the present embodiment. First, for example, the display device 1 is powered on, and thereby the control unit 30 starts an operation of the touch panel 20. The control unit 30 first selects one or a plurality of electrodes (the first electrodes E1 and the second electrodes E2) included in the sensor electrode 21A, and applies an AC signal to the selected electrodes. At this time, if the finger or the like is touched on the detection surface, the control unit 30 detects a capacitance variation occurring in the sensor electrode 21A due to the touch of the finger or the like on the detection surface as a variation in an output voltage. The control unit 30 derives the touch coordinates of the finger or the like on the basis of the information on the detected output voltage (or the variation in the output voltage). The control unit 30 outputs the derived information on the touch coordinates of the finger or the like to an external device.

[Effects]

Next, effects of the display device 1 according to the present embodiment will be described. In the present embodiment, the distance D1 between the two contact holes 26A so as to correspond to both ends of the relay electrode E4 is shorter than the distance D2 between the two island-shaped electrodes E3 coming into contact with both ends of the relay electrode E4. Thereby, the length of the relay electrode E4 in the longitudinal direction can be made smaller and the area of the relay electrode E4 can be made smaller than in the case where the distance D1 is longer than the distance D2 (refer to FIG. 8). As a result, a silhouette of the electrode pattern can be made difficult to view.

In addition, it is possible to reduce the area of the relay electrode E4 by optimizing positions of the contact holes 26A. For this reason, it is not necessary to add new members to the electrode structure shown in the comparative example of FIG. 8 or to perform a fundamental change in the electrode structure. Therefore, it is possible to manufacture the sensor electrode 21A with the same number of steps as the number of the manufacturing steps of the electrode structure shown in the comparative example of FIG. 8.

3. MODIFIED EXAMPLES

As above, the embodiment of the present technology has been described, but the present technology is not limited to the embodiment and may be variously modified.

First Modified Example

Figure 9:
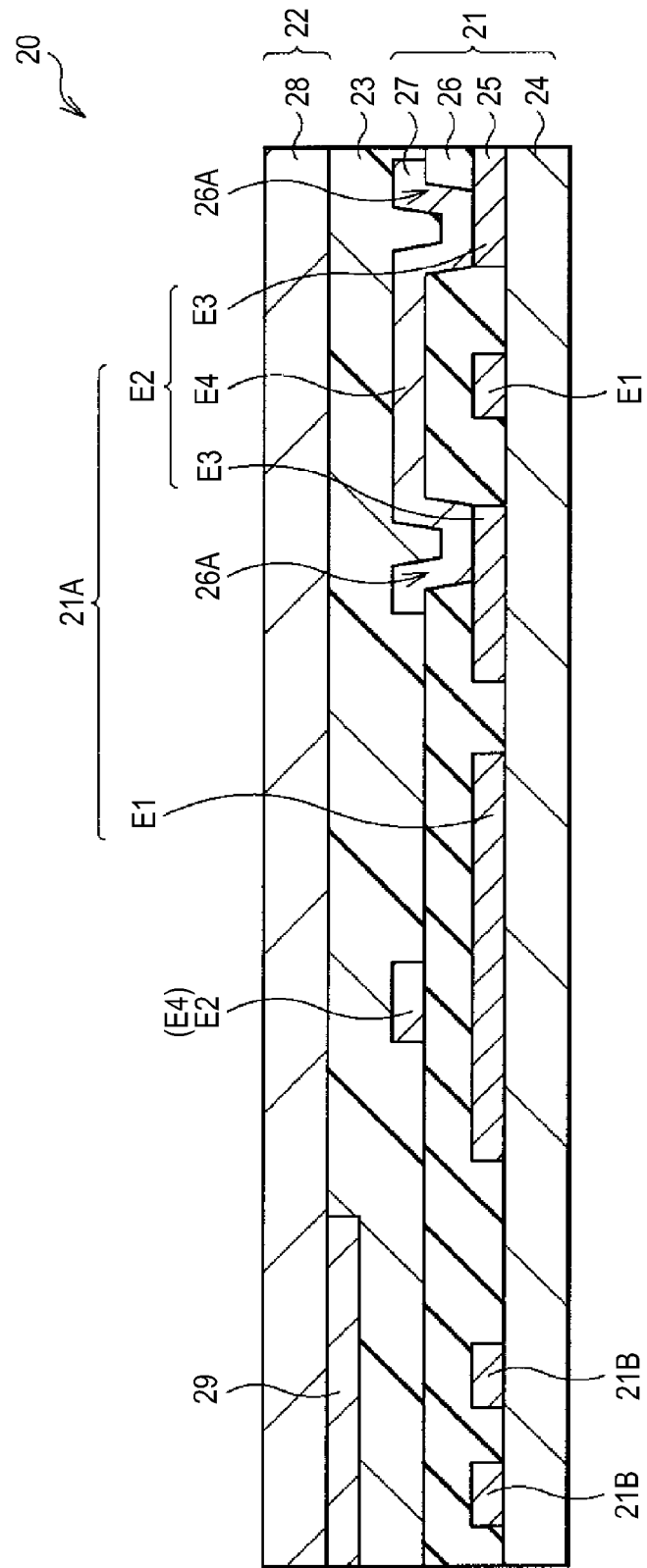
FIG. 9 is a diagram illustrating another example of the cross-sectional configuration of the touch panel of FIG. 4.
Figure 10:
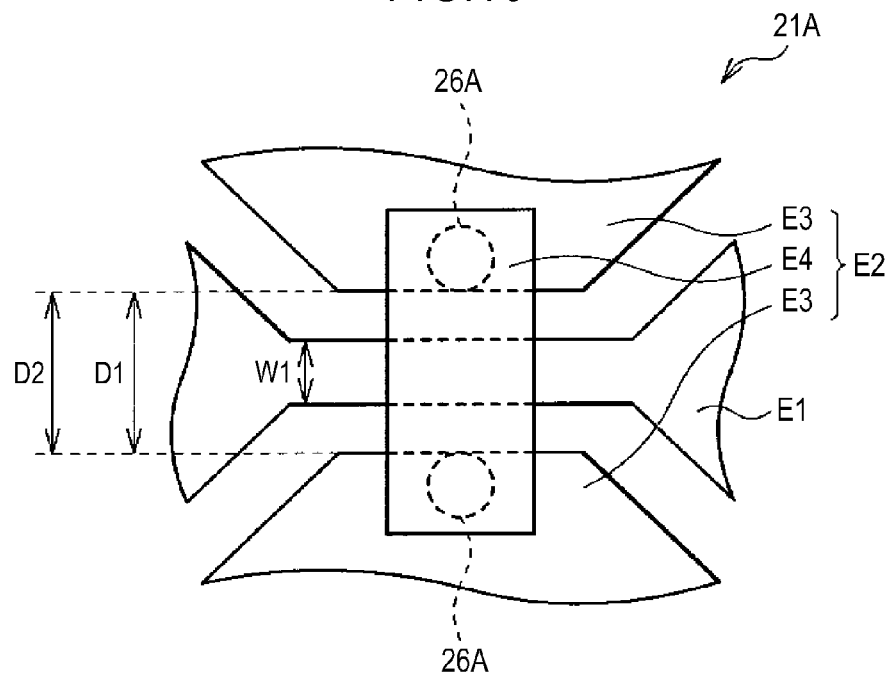
FIG. 10 is a diagram illustrating an example of the enlarged layout of the electrode pattern of FIG. 9.

For example, although, in the above-described embodiment, the distance D1 is shorter than the distance D2, the distance D1 may be the same as the distance D2 as shown in FIGS. 9 and 10. However, in this case, only the upper surfaces of the island-shaped electrodes E3 are exposed to the bottom surfaces of the contact holes 26A.

Second Modified Example

Although, in the above-described embodiment and first modified example, the substrate 24 which is a substrate on which the first conductive layer 25, the insulating layer 26, and the second conductive layer 27 are formed is provided, a translucent and insulating layer may be provided instead of the substrate 24. In addition, a first translucent member may be provided instead of the substrate 24, and a second translucent member may be provided instead of the substrate 28. At this time, a surface of the second translucent member on an opposite side to the first translucent member forms a detection surface.

4. APPLICATION EXAMPLE

Figure 11:
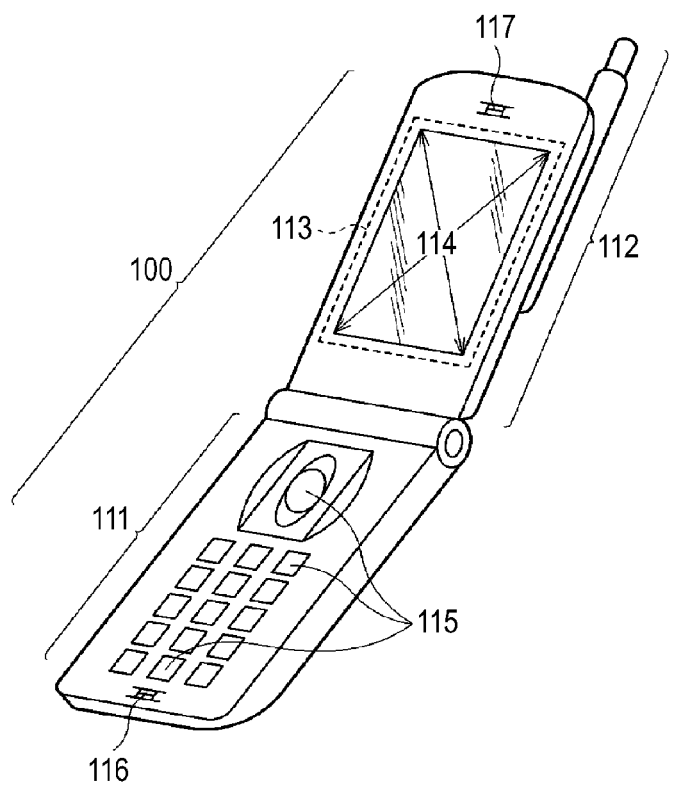
FIG. 11 is a diagram illustrating an example of the schematic configuration of an electronic apparatus according to an application example.
Figure 12:
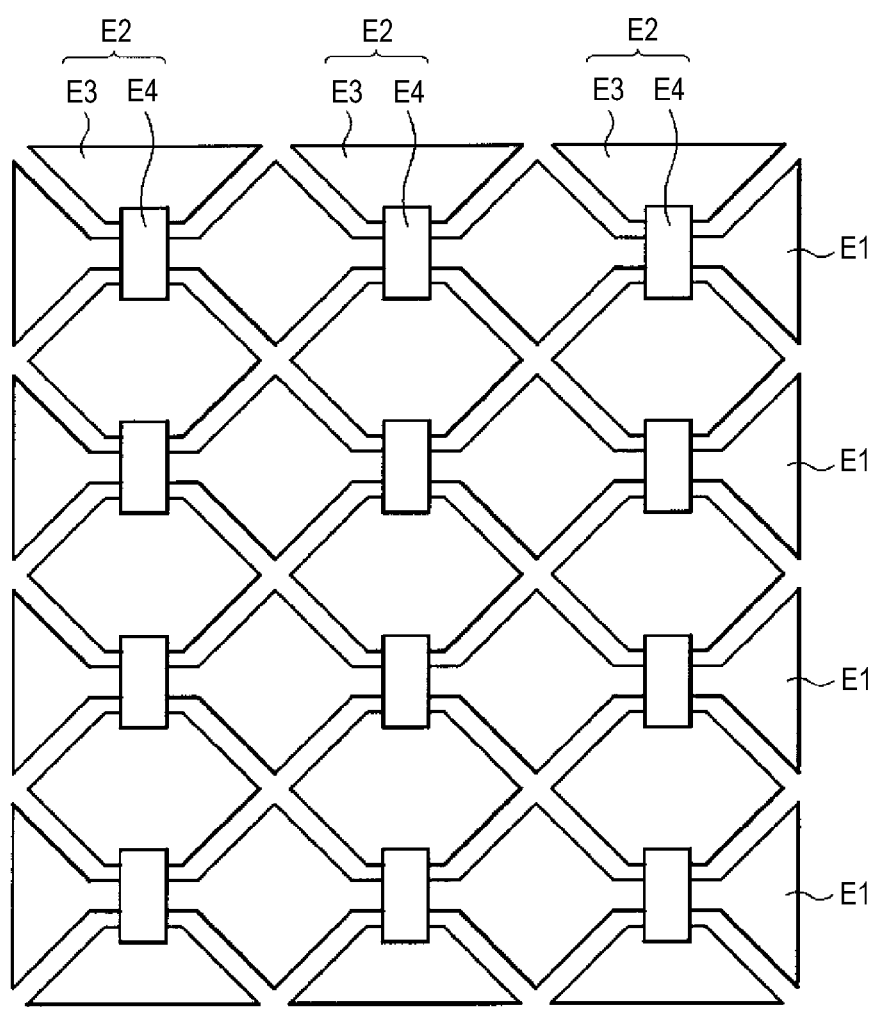
FIG. 12 is a diagram illustrating an example of the layout of the electrode pattern of the touch panel according to a comparative example.

Next, an application example of the display device 1 related to the above-described embodiment and modified examples will be described. FIG. 11 is a perspective view illustrating an example of the schematic configuration of an electronic apparatus 100 according to the application example. The electronic apparatus 100 is a mobile phone, and, for example, as shown in FIG. 11, includes a main body unit 111 and a display body unit 112 which can be opened and closed with respect to the main body unit 111. The main body unit 111 has operation buttons 115 and a transmission portion 116. The display body unit 112 has a display device 113 and a reception portion 117. The display device 113 performs a variety of displays regarding telephone communication on a display screen 114 of the display device 113. The electronic apparatus 100 includes a control unit (not shown) for controlling an operation of the display device 113. The control unit is provided as a part of a controller controlling the entire electronic apparatus 100, or is provided inside the main body unit 111 or the display body unit 112 separately from the controller.

The display device 113 has the same configuration as the display device 1 according to the above-described embodiment and modified examples thereof. Thereby, in the display device 1, it is difficult for a silhouette of the electrode pattern to be viewed, and thus it is possible to obtain high display quality.

In addition, electronic apparatuses which may employ the display device 1 according to the above-described embodiment and modified examples thereof may include not only the above-described mobile phone, but also a personal computer, a liquid crystal television, a view finder type or a monitor direct-view type video tape recorder, a car navigation apparatus, a pager, an electronic notebook, a calculator, a word processor, a workstation, a television telephone set, a POS terminal, and the like.

Further, for example, the present technology may be implemented as the following configurations.

(1) A touch panel including a plurality of first electrodes extending in a first direction; a plurality of second electrodes extending in a direction intersecting the first direction; and an insulating layer insulating and separating the first electrodes from the second electrodes, wherein the second electrodes are strip-shaped electrodes which include a plurality of first island-shaped electrodes formed in the same layer as the first electrodes and relay electrodes electrically connecting two adjacent first island-shaped electrodes to each other and crossing over the first electrodes, wherein the insulating layer has contact holes at positions corresponding to both ends of each of the relay electrodes in a longitudinal direction, and wherein a distance between two contact holes provided so as to correspond to both the ends of each of the relay electrodes in the longitudinal direction is the same as or shorter than a distance between two first island-shaped electrodes coming into contact with both the ends of each of the relay electrodes.

(2) The touch panel set forth in (1), further including a first translucent member and a second translucent member disposed so as to be opposite to each other with the first electrodes, the second electrodes, and the insulating layer interposed therebetween, wherein a surface of the second translucent member on an opposite side to the first translucent member forms a detection surface, and wherein the relay electrodes are disposed so as to be closer to the second translucent member than the first island-shaped electrodes.

(3) The touch panel set forth in (1) or (2), wherein the first electrodes are strip-shaped electrodes which include a plurality of second island-shaped electrodes and connection electrodes connecting two adjacent second island-shaped electrodes to each other.

(4) The touch panel set forth in (3), wherein the first island-shaped electrodes and the second island-shaped electrodes have a delta arrangement.

(5) A display device including an image generation unit that generates an image; a touch panel that is disposed on a surface of the image generation unit; and a control unit that controls the image generation unit and the touch panel, wherein the touch panel includes a plurality of first electrodes extending in a first direction; a plurality of second electrodes extending in a direction intersecting the first direction; and an insulating layer insulating and separating the first electrodes from the second electrodes, wherein the second electrodes are strip-shaped electrodes which include a plurality of first island-shaped electrodes formed in the same layer as the first electrodes and relay electrodes electrically connecting two adjacent first island-shaped electrodes to each other and crossing over the first electrodes, wherein the insulating layer has contact holes at positions corresponding to both ends of each of the relay electrodes in a longitudinal direction, and wherein a distance between two contact holes provided so as to correspond to both the ends of each of the relay electrodes in the longitudinal direction is the same as or shorter than a distance between two first island-shaped electrodes coming into contact with both the ends of each of the relay electrodes.

(6) An electronic apparatus including a display device, wherein the display device includes an image generation unit that generates an image; a touch panel that is disposed on a surface of the image generation unit; and a control unit that controls the image generation unit and the touch panel, wherein the touch panel includes a plurality of first electrodes extending in a first direction; a plurality of second electrodes extending in a direction intersecting the first direction; and an insulating layer insulating and separating the first electrodes from the second electrodes, wherein the second electrodes are strip-shaped electrodes which include a plurality of first island-shaped electrodes formed in the same layer as the first electrodes and relay electrodes electrically connecting two adjacent first island-shaped electrodes to each other and crossing over the first electrodes, wherein the insulating layer has contact holes at positions corresponding to both ends of each of the relay electrodes in a longitudinal direction, and wherein a distance between two contact holes provided so as to correspond to both the ends of each of the relay electrodes in the longitudinal direction is the same as or shorter than a distance between two first island-shaped electrodes coming into contact with both the ends of each of the relay electrodes.

The present disclosure contains subject matter related to that disclosed in Japanese Priority Patent Application JP 2012-012396 filed in the Japan Patent Office on Jan. 24, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel comprising:
a plurality of first electrodes extending in a first direction;
a plurality of second electrodes extending in a direction intersecting the first direction; and
an insulating layer insulating and separating the first electrodes from the second electrodes,
wherein the second electrodes are strip-shaped electrodes which include a plurality of first island-shaped electrodes formed in the same layer as the first electrodes and relay electrodes electrically connecting two adjacent first island-shaped electrodes to each other and crossing over the first electrodes,
wherein the insulating layer has contact holes at positions corresponding to both ends of each of the relay electrodes in a longitudinal direction, and
wherein a gap between two contact holes opposite to each other provided so as to correspond to both the ends of each of the relay electrodes in the longitudinal direction is shorter than the shortest distance between two first island-shaped electrodes opposite to each other coming into contact with both the ends of each of the relay electrodes.

2. The touch panel according to claim 1, further comprising:
a first translucent member and a second translucent member disposed so as to be opposite to each other with the first electrodes, the second electrodes, and the insulating layer interposed therebetween,
wherein a surface of the second translucent member on an opposite side to the first translucent member forms a detection surface, and
wherein the relay electrodes are disposed so as to be closer to the second translucent member than the first island-shaped electrodes.

3. The touch panel according to claim 1, wherein the first electrodes are strip-shaped electrodes which include a plurality of second island-shaped electrodes and connection electrodes connecting two adjacent second island-shaped electrodes to each other.

4. The touch panel according to claim 3, wherein the first island-shaped electrodes and the second island-shaped electrodes have a delta arrangement.

5. A display device comprising:
an image generation unit that generates an image;

a touch panel that is disposed on a surface of the image generation unit; and
a control unit that controls the image generation unit and the touch panel,
wherein the touch panel includes
- a plurality of first electrodes extending in a first direction;
- a plurality of second electrodes extending in a direction intersecting the first direction; and
- an insulating layer insulating and separating the first electrodes from the second electrodes,
wherein the second electrodes are strip-shaped electrodes which include a plurality of first island-shaped electrodes formed in the same layer as the first electrodes and relay electrodes electrically connecting two adjacent first island-shaped electrodes to each other and crossing over the first electrodes,
wherein the insulating layer has contact holes at positions corresponding to both ends of each of the relay electrodes in a longitudinal direction, and
wherein a gap between two contact holes opposite to each other provided so as to correspond to both the ends of each of the relay electrodes in the longitudinal direction is shorter than the shortest distance between two first island-shaped electrodes opposite to each other coming into contact with both the ends of each of the relay electrodes.

6. An electronic apparatus comprising:
a display device,
wherein the display device includes
an image generation unit that generates an image;
a touch panel that is disposed on a surface of the image generation unit; and
a control unit that controls the image generation unit and the touch panel,
wherein the touch panel includes
- a plurality of first electrodes extending in a first direction;
- a plurality of second electrodes extending in a direction intersecting the first direction; and
- an insulating layer insulating and separating the first electrodes from the second electrodes,
wherein the second electrodes are strip-shaped electrodes which include a plurality of first island-shaped electrodes formed in the same layer as the first electrodes and relay electrodes electrically connecting two adjacent first island-shaped electrodes to each other and crossing over the first electrodes,
wherein the insulating layer has contact holes at positions corresponding to both ends of each of the relay electrodes in a longitudinal direction, and
wherein a gap between two contact holes opposite to each other provided so as to correspond to both the ends of each of the relay electrodes in the longitudinal direction is shorter than the shortest distance between two first island-shaped electrodes opposite to each other coming into contact with both the ends of each of the relay electrodes.

7. The touch panel according to claim 1, wherein a layer in which the relay electrodes are formed is closer to the surface of the touch panel than the layer in which the first electrodes and the first island-shaped electrodes are formed, and each of the relay electrodes electrically connects the two adjacent first island-shaped electrodes via contact holes.

* * * * *